US008683557B1

(12) United States Patent
Desikan et al.

(10) Patent No.: US 8,683,557 B1
(45) Date of Patent: Mar. 25, 2014

(54) DELEGATION AS A MECHANISM TO MANAGE BUSINESS ACTIVITY BY TAKING ON A SHARED IDENTITY

(75) Inventors: Pavan K. Desikan, Palo Alto, CA (US); Michael Nestler, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/366,233

(22) Filed: Feb. 3, 2012

Related U.S. Application Data

(60) Provisional application No. 61/439,872, filed on Feb. 5, 2011.

(51) Int. Cl.
*G06F 17/21* (2006.01)
*G06F 15/16* (2006.01)
*H04L 29/06* (2006.01)
*G06F 21/31* (2013.01)
*G06Q 10/10* (2012.01)

(52) U.S. Cl.
CPC ........... *H04L 63/08* (2013.01); *G06F 21/31* (2013.01); *G06Q 10/101* (2013.01)
USPC ............. 726/4; 726/3; 726/5; 726/6; 726/7; 726/8; 709/204; 709/205; 709/229; 709/246

(58) Field of Classification Search
USPC ........... 726/1–8; 713/168, 176; 709/204, 205, 709/229, 246
See application file for complete search history.

(56) References Cited

U.S. PATENT DOCUMENTS

| 6,130,938 | A | 10/2000 | Erb |
| 6,182,142 | B1 * | 1/2001 | Win et al. ................ 709/229 |
| 6,192,119 | B1 | 2/2001 | Wilson |
| 6,697,478 | B1 | 2/2004 | Meldrum et al. |
| 6,732,172 | B1 * | 5/2004 | House et al. ............... 709/225 |
| 6,754,322 | B1 | 6/2004 | Bushnell |
| 7,106,848 | B1 | 9/2006 | Barlow et al. |
| 7,185,047 | B1 * | 2/2007 | Bate et al. ................. 709/202 |

(Continued)

FOREIGN PATENT DOCUMENTS

WO  WO02079984  10/2002

OTHER PUBLICATIONS

G. Kitagata, D. Chakraborty; S. Ogawa, A. Takeda, K. Hashimoto, N. Shiratori : "Visitor access control scheme utilizing social relationship in the real world", IFIPTM, IFIP AICT (International Federation for Infromation Processing) 321, pp. 95-107, 2010.*

(Continued)

*Primary Examiner* — Catherine Thiaw
(74) *Attorney, Agent, or Firm* — Patent Law Works LLP

(57) ABSTRACT

A system, method and computer program product for using delegation as a mechanism to manage business activity by taking on a shared identity. In some implementations, the system includes a user interface module for receiving input signals from and sending information to a user, a delegate authentication module and an identity translation module. The delegate authentication module is operable to determine that an individual user identity is authorized to act as a delegate for an organization having an identity on a network-based software application and generate a verification signal. The delegate authentication module is coupled to the user interface module to receive the input signals from the user. The identity translation module is operable to translate the input signals from the user to a format such that they appear to be from the identity of the organization.

23 Claims, 8 Drawing Sheets

(56) References Cited

U.S. PATENT DOCUMENTS

| | | | |
|---|---|---|---|
| 7,366,990 B2 | 4/2008 | Pitroda | |
| 7,447,701 B2* | 11/2008 | Agarwal et al. | 1/1 |
| 7,555,110 B2 | 6/2009 | Dolan et al. | |
| 7,610,287 B1 | 10/2009 | Dean et al. | |
| 7,647,398 B1* | 1/2010 | Fan | 709/224 |
| 7,742,468 B2 | 6/2010 | Vagelos | |
| 8,175,224 B2* | 5/2012 | Kirchmeier et al. | 379/37 |
| 2002/0137490 A1 | 9/2002 | Gallant | |
| 2002/0143874 A1 | 10/2002 | Marquette et al. | |
| 2002/0162018 A1* | 10/2002 | Gunter et al. | 713/201 |
| 2004/0258220 A1 | 12/2004 | Levine et al. | |
| 2005/0050354 A1* | 3/2005 | Gociman | 713/201 |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0185737 A1* | 8/2007 | Friedlander et al. | 705/3 |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0064280 A1* | 3/2009 | Babeanu et al. | 726/3 |
| 2010/0235896 A1* | 9/2010 | Hirsch | 726/7 |
| 2010/0292996 A1* | 11/2010 | Margrett et al. | 705/1.1 |
| 2011/0098156 A1 | 4/2011 | Ng et al. | |
| 2011/0167483 A1* | 7/2011 | Lee et al. | 726/6 |
| 2012/0072261 A1* | 3/2012 | Oberoi et al. | 705/7.32 |
| 2012/0117656 A1* | 5/2012 | Arsac et al. | 726/26 |
| 2012/0158841 A1* | 6/2012 | Liu | 709/204 |

OTHER PUBLICATIONS

D. Corey Long: "Constructing the profitable conversation: a semiotic analysis of the company blog as a form of advertising", University of Oslo, Hosten 2006.*

Norbert Walker: "Blogs: the new magic formula for corporate communications?", Published by Deutsche Bank Research, Aug. 22, 2005.*

Pattie Maes: Agents that reduce work and information overload, Communications of the ACM, 1994, pp. 1-17.*

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Indtitute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 8, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

DELEGATION AS A MECHANISM TO MANAGE BUSINESS ACTIVITY BY TAKING ON A SHARED IDENTITY

CROSS REFERENCE TO RELATED APPLICATIONS

This application claims the benefit under 35 U.S.C. §119(e) of U.S. Provisional Application No. 61/439,872, entitled "DELEGATION AS A MECHANISM TO MANAGE BUSINESS ACTIVITY BY TAKING ON A SHARED IDENTITY" filed on Feb. 5, 2011, the entire contents of which are incorporated herein by reference.

BACKGROUND

The present disclosure relates to social networks and electronic communication. In particular, the present disclosure relates to using delegation as a mechanism to manage business activity by taking on a shared identity.

Social networks have grown in popularity and usage in recent years. In fact, so many users have begun to use social networks, that many businesses and organizations have likewise created an organizational identity on such social networks to create a business presence. This organizational identity is similar to the identity (node) of a particular individual that has been created on a social network. The business or organization through its organizational identity engages in any of these social network activities, for example, e-mailing, blogging, micro-blogging, indicating acknowledgment which can be a positive or negative endorsement, indicating interest, indicating friends, etc.

However, businesses and organizations are not individuals (human beings). Therefore businesses and organizations require other individuals to act on their behalf and engage in the social networking activities. The organizational identity has historically been treated the same or as an individual identity, and provides a fixed company login and password to access the features and functionality of the social network corresponding to the organizational identity. Thus, a business or organization is often required to provide that password and login to multiple employees that are managing the organizational identity. This is problematic as employees often change positions, or even leave the business organization, thereby changing their responsibility for managing the organization's presence on the social network.

Businesses and organizations have also historically been provided with a different interface for managing their presence on the social network. For example, some social networks often provide a separate business page that allows users to interact with the social network and manage their business presence. Oftentimes the separate business page does not have all the functionality available through the standard user interface provided for individuals. Besides reduced functionality, this approach also has the shortcoming of making it more difficult for users to interact on behalf of the business organization in a social network because of the different user interface.

SUMMARY

In one innovative aspect, the system includes a user interface module for receiving input signals from and sending information to a user, a delegate authentication module and an identity translation module. The delegate authentication module is operable to determine that an individual user identity is authorized to act as a delegate for an organization having an identity on a network-based software application and generate a verification signal. The delegate authentication module is coupled to the user interface module to receive the input signals from the user. The identity translation module is operable to translate the input signals from the user to a format such that they appear to be from the identity of the organization. The identity translation module is coupled to the user interface module to send and receive information, and is coupled to the delegate authentication module to receive the verification signal.

In general, another innovative aspect of the subject matter described in this disclosure may be embodied in methods that include determining by a processor that an individual user identity is authorized to manage activity on a network-based software application for a user associated with the individual user identity, determining by the processor that the individual user identity is authorized to act as a delegate for an organization having an identity on the network-based software application, receiving by the processor under the individual user identity input to manage the business activity associated with the organization, translating the input to manage the business activity received under the individual user identity as being received under an identity of the organization, and processing the input to manage the business activity by executing instructions associated with the input using the identity of the specified organization.

Other implementations of one or more of these aspects include corresponding systems, apparatus and computer programs, configured to perform the actions of the methods, encoded on computer storage devices.

For instance, the system may further include a delegation creation module for creating a delegation relationship between the individual user identity and the organization; a delegation creation module for receiving authentication credentials for the individual user identity from the user; the delegate authentication module configured to authenticate the individual user identity by comparing the authentication credentials against credentials stored in a data store; the delegation creation module further configured to generate a user interface for requesting a delegation allowing the individual user identity to act on behalf of the organization, receive a request for the delegation via the user interface, and obtain authorization for the delegation via a predefined mechanism; a data store storing one or more delegations between one or more organizations and the individual user identity; the delegate authentication module configured to provide the individual user identity access to act on behalf of the one or more organizations for which a delegation is stored in the data store; the user interface module operable to generate a shared identity user interface including a selector to specify an identity to be managed from at least the individual user identity and identities of the one or more organizations, and a region to accept input to manage business activity and display information related to the identity specified with the selector, the user interface module being further configured to present the shared identity user interface to a user associated with the individual user identity authorized to act as the delegate for the one or more organizations; the network-based software application is a social network; the business activity is one from the group of posting, blogging, sharing photos, approving, disapproving, and acknowledging using a positive or negative endorsement; and the selector is a tab and the region is window area corresponding to the tab.

For instance, the operations may further include receiving authentication credentials for the individual user identity from the user associated with the individual user identity; authenticating the individual user identity by comparing the authentication credentials against credentials stored in a data store; determining including identifying in a data store one or more delegations between one or more organizations and the individual user identity and providing the individual user identity access to act on behalf of the one or more organizations for which a delegation is identified in the data store; identifying including identifying a plurality of delegations between a plurality of organizations and the individual user identity; providing including providing the individual user identity access to act on behalf of each of the plurality of organizations; providing information for a user interface for requesting a delegation allowing the individual user identity to act on behalf of the organization; receiving a request for the delegation; obtaining authorization for the delegation via a predefined mechanism; generating a shared identity user interface including a selector to specify an identity to be managed from at least the individual user identity and the identity of an organization, and a region to accept input to manage the business activity and display information related to the identify specified with the selector; and presenting the shared identity user interface to the user associated with the individual user identity authorized to act as the delegate for the organization.

The systems, methods and apparatus described are particularly advantageous in a number of respects. First, using them, a delegate can act on behalf of one or more organizations with no additional user authentication being required. Second, a delegate can use them without having to learn various user interfaces, possibly with different functionality, where each of the different user interfaces correspond to a different organization. Third, they provide a convenient mechanism for a delegate to switch contexts from interfacing with a social network as an individual versus interfacing with the social network as an organization. Fourth, they provide a convenient mechanism for an organization to delegate rights to any number of people depending on the size of the organization. Fifth, they provide a convenient mechanism for restricting or modifying a user interface provided for each individual user acting as a delegate for the organization so as to provide different types of functionality to different users while still allowing them to appear on the social network as if they are acting on behalf of the organization. However, this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
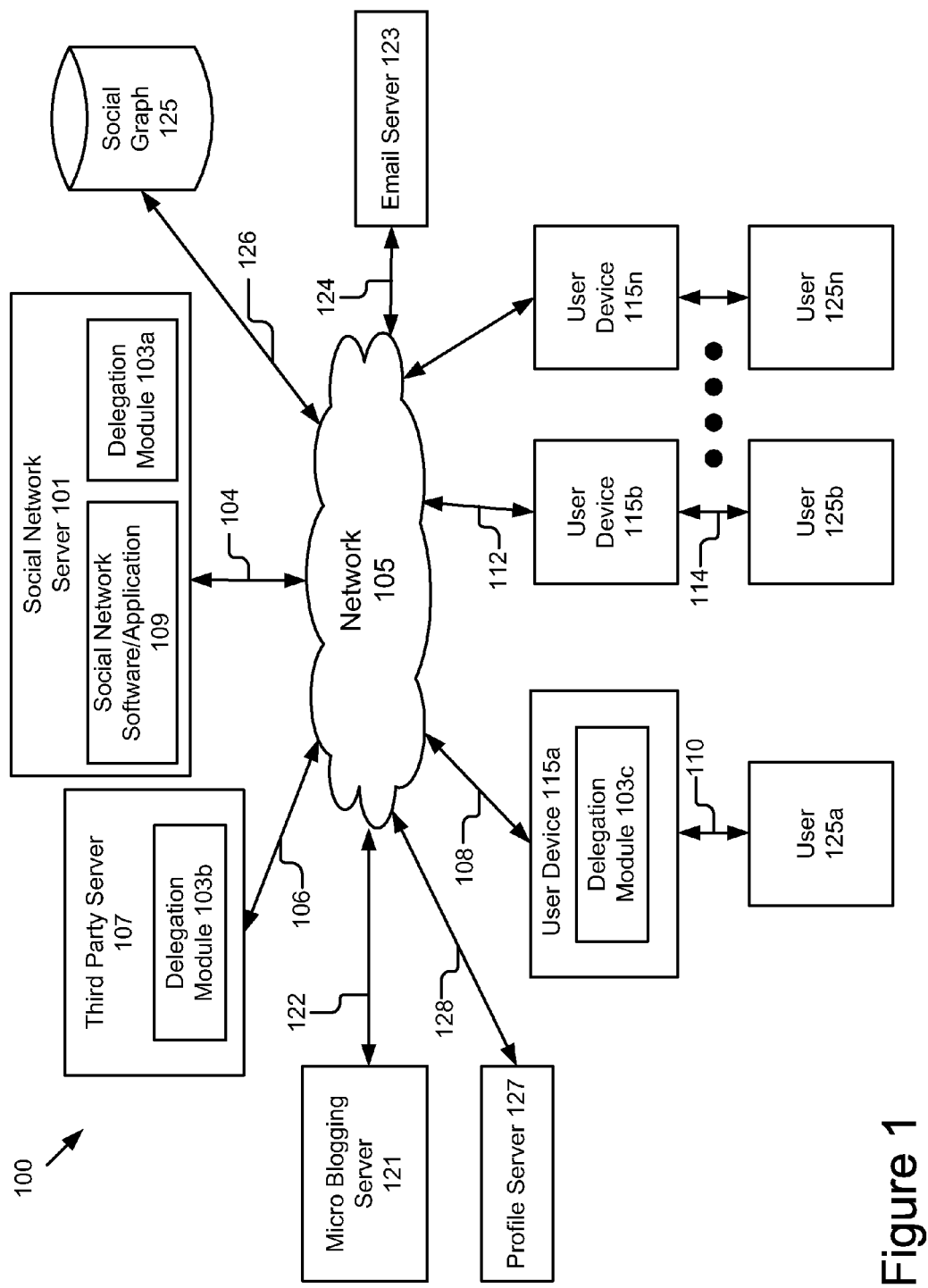
FIG. 1 is a block diagram illustrating an example system for using delegation as a mechanism to manage business activity by taking on a shared identity.

FIG. 1 illustrates a block diagram of an example system 100 for using delegation as a mechanism to manage business activity by taking on a shared identity. The illustrated system 100 for delegation includes user devices 115a, 115b, 115n that are accessed by users 125a, 125b, 125n, a social network server 101, a third party server 107, a micro blogging server 121, a profile server 127, a social graph 125, and an email server 123. In the illustrated embodiment, these entities are communicatively coupled via a network 105. Although only three user devices are illustrated, it should be understood that any numbers of user devices 115n are available to any number of users 125n.

The user devices 115a, 115b, 115n in FIG. 1 are used by way of example. While FIG. 1 illustrates three user devices, the present disclosure applies to any system architecture having one or more user devices. Furthermore, while only one network 105 is coupled to the user devices, 115a, 115b, 115n, the social network server 101 and the third party server 107, in practice any number of networks 105 can be connected to the entities. Furthermore, while only one third party server 107 is shown, the system 100 could include one or more third party servers 107.

In some implementations, the delegation module 103a is operable on the social network server 101, which is coupled to the network 105 via signal line 104. The social network server 101 also includes a social network software/application 109. Although only one social network server 101 is shown, it should be understood that multiple servers may be present. A social network is any type of social structure where the users are connected by a common feature. The common feature includes friendship, family, work, an interest, etc. The common features are provided by one or more social networking systems, for example those included in the system 100, including explicitly-defined relationships and relationships implied by social connections with other online users, where the relationships form a social graph. In some examples, the social graph can reflect a mapping of these users and how they are related.

In other implementations, the delegation module 103b is stored on a third party server 107, which is connected to the network 105 via signal line 106. In yet other implementations, the delegation module 103c is stored on a user device 115a, which is connected to the network 105 via signal line 108. The user 125a interacts with the user device 115a via signal line 110. Similarly, the user device 115b is coupled to the network 105 via signal line 112 and the user 125b interacts with the user device 115b via signal line 114. It should be understood that the delegation module can be stored in any combination on the devices and servers.

The network 105 is a conventional type, wired or wireless, and may have any number of configurations including, for example, a star configuration, token ring configuration or other known configurations. Furthermore, the network 105 may comprise a local area network (LAN), a wide area network (WAN) (e.g., the Internet), and/or any other interconnected data path across which multiple devices may communicate. In yet other implementations, the network 105 may be a peer-to-peer network. The network 105 may also be coupled to or includes portions of a telecommunications network for sending data in a variety of different communication protocols. In yet other implementations, the network 105 includes Bluetooth communication networks or a cellular communications network for sending and receiving data. For example, the network 105 may send or receive data via short messaging service (SMS), multimedia messaging service (MMS), hypertext transfer protocol (HTTP), direct data connection, WAP, email, etc.

The delegation module 103 receives data for creating, authenticating and using a delegation relationship between an individual identity and an organizational identity as a mechanism to manage business activity. In some implementations, the delegation module 103-receives data from a user via user devices 115, the social network application 109, and/or the third party server 107. The social network application 109 in conjunction with the delegation module 103 are used to manage and send data to and from the third party server 107 via signal line 106, the micro-blogging server 121 via signal line 122, the profile server 127 via signal line 128, the user devices 115 via signal lines 108 and 112, the e-mail server 123 via signal line 124, and the social graph 125 via signal line 126.

Figure 2:
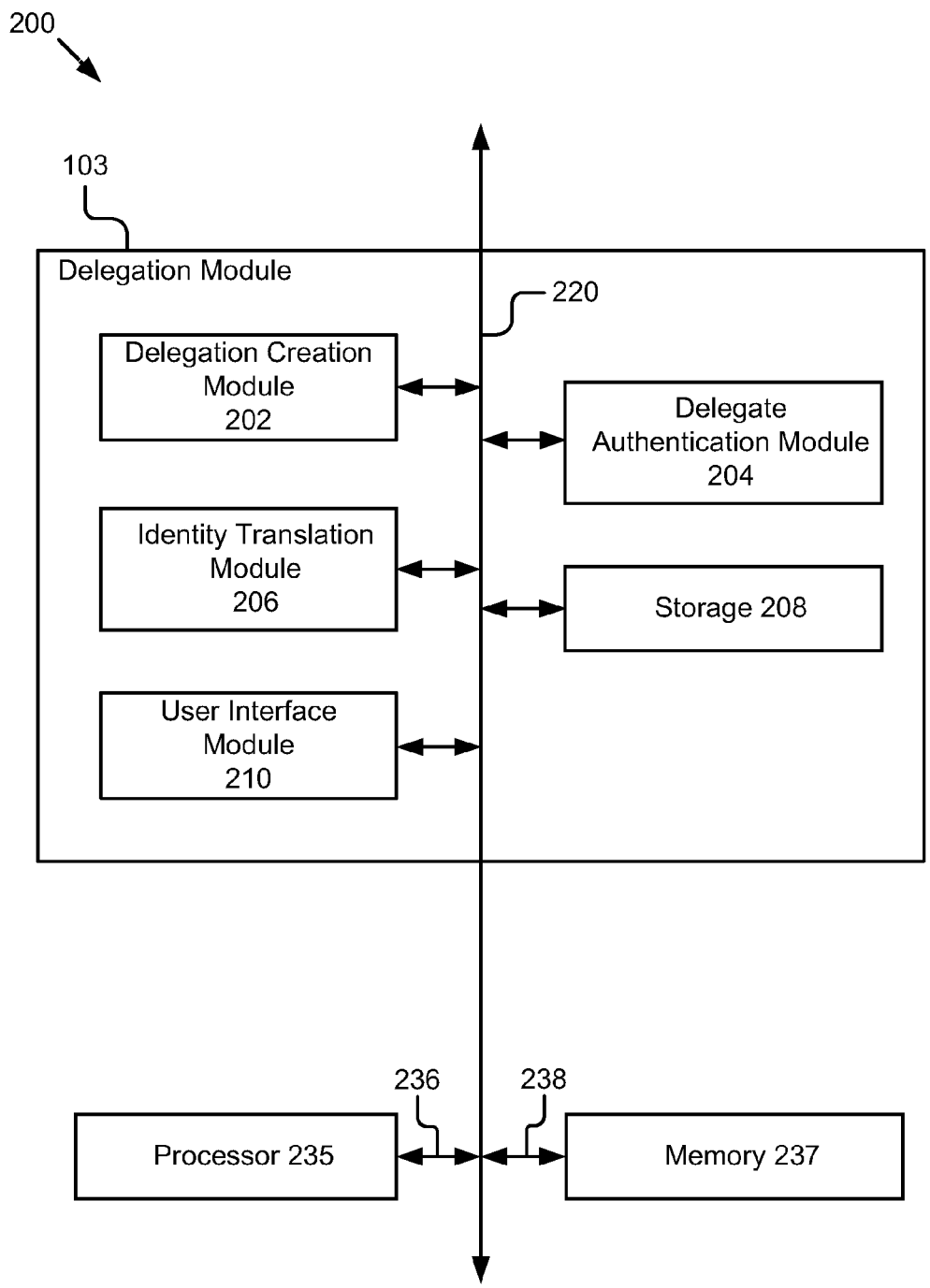
FIG. 2 is a block diagram illustrating an example delegation module.

Referring now to FIG. 2, the delegation module 103 is shown in more detail. FIG. 2 is a block diagram of a computing device 200 that includes the content module 103, a memory 237 and a processor 235. In some implementations, the computing 200 device is a social network server 101. In other implementations, the computing device 200 is a third party server 107. In yet other implementations, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It should be understood that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other known memory device. In some implementations, the memory 237 also includes a non-volatile memory or similar permanent storage device and media including, for example, a hard disk drive, a floppy disk drive, a CD-ROM device, a DVD-ROM device, a DVD-RAM device, a DVD-RW device, a flash memory device, or some other mass storage device known for storing information on a more permanent basis.

In some implementations, the delegation module 103 comprises a delegation creation module 202, a delegate authentication module 204, an identity translation module 206, data storage 208 and a user interface module 210. These modules are configured for communication with each other, the processor 235 and the memory 237 via bus 220. The bus 220 can be any type of conventional communication bus.

The delegation creation module 202 is software including routines for creating a delegation relationship between a business organization identity in the social network application 109 and an individual user identity in the social network application 109. In some implementations, the delegation creation module 202 stores instructions that, when executed by the processor 235, causes the creation of this delegation relationship. In other implementations, the delegation creation module 202 is a set of instructions executable by the processor 235 to provide the functionality described below with reference to FIG. 4. In yet other implementations, the delegation creation module 202 is stored in the memory 237 of the computing device 200 and is accessible and executable by the processor 235. The delegation creation module 202 is coupled to the social network application 109 to send and receive information about individual user login credentials and existence of delegation relationships. In some implementations, the delegation relationships are stored in the social network application 109. In other implementations, the delegation relationships are stored in the data storage 208 of the delegation module 103. The delegation creation module 202 is also coupled by the network 105 to the user device 115 to receive input from the user. In other implementations, the delegation creation module 202 is coupled to the profile server 127 in instances where the individual user authorization credentials and the organizations delegation relationships are stored in the profile server 127.

The delegate authentication module 204 is software including routines for verifying that a particular user is authorized to act on behalf of an organization, in other words, has been delegated rights to act for the organization on the social network. The delegate authentication module 204 also creates and presents, in response to user login, the shared identity user interface 306. In some implementations, the delegate authentication module 204 stores data that, when executed by the processor 235 causes the verification of delegation relationships and the creation and presentation of the shared identity user interface 306. In other implementations, the delegate authentication module 204 is a set of instructions executable by the processor 235 to provide the functionality described below with reference to FIG. 5. In yet other implementations, the delegate authentication module 204 is stored in the memory 237 of the computing device 200 and is accessible and executable by the processor 235. The delegate authentication module 204 is coupled to the social network application 109, the user device 115, and the data store 208 to send and receive information about individual user login credentials and verify the existence of delegation relationships. The delegate authentication module 204 is coupled to the user interface module 210 to generate the shared identity user interface 306, and to initiate activation of the identity translation module 206. In other implementations, the delegate authentication module 204 is coupled to the profile server 127 in instances where the individual user authorization credentials and the organizations delegation relationships are stored in the profile server 127.

The identity translation module 206 is software including routines for processing and translating data and commands received from an individual user identity to format such that they appear to be from an organization identity. The identity translation module 206 is responsive to input and commands from the shared identity user interface 306 and automatically outputs data and commands from either the individual user identity or an organization identity to which the user has been delegated rights. The identity translation module 206 determines whether an organizational interface from the shared identity user interface 306 is being used and if so modifies the data and commands to appear as if the business activity is being managed by the organization. In some implementations, the identity translation module 206 stores data that, when executed by the processor 235, causes the translation of data and commands to be from the organizational identity. In other implementations, the identity translation module 206 is a set of instructions executable by the processor 235 to provide the functionality described below with reference to FIG. 6. In yet other implementations, the identity translation module 206 is stored in the memory 237 of the computing device 200 and is accessible and executable by the processor 235. The identity translation module 206 is coupled to the social network application 109, the user device 115, the data store 208, and the user interface module 210 of the delegation module 103. The identity translation module 206 is coupled to receive input from the user device 115, coupled to the delegate authentication module 204 to verify that the user is authorized to ask the delegate, and coupled to the social network application 109 to provide translated or processed user input.

In some implementations, data storage 208 stores data and information of users 125*a*/125*b*/125*n* of the system 100. Such stored information includes user profiles, user login information and other information identifying the users 125*a*/125*b*/125*n* of the system 100. As noted above, the data storage 208 in certain implementations also includes delegate relationships between individual identities and organizational identities. Examples of information identifying users includes, but is not limited to, the user's name, contact information, relationship status, acknowledgements which can be positive or negative endorsements, interests, links, education and employment, location, etc. In some implementations, the information stored in data storage 208 also includes the user's list of current and past connections (which can include friends, etc.) and the user's activities within the system 100, for example anything the user posts within the system 100 and any messages that the user sends to other users. In other implementations, the data storage 110 stores the data and information associated with the activity of the user login server 101. Such information may include user preference information.

Figure 3A:
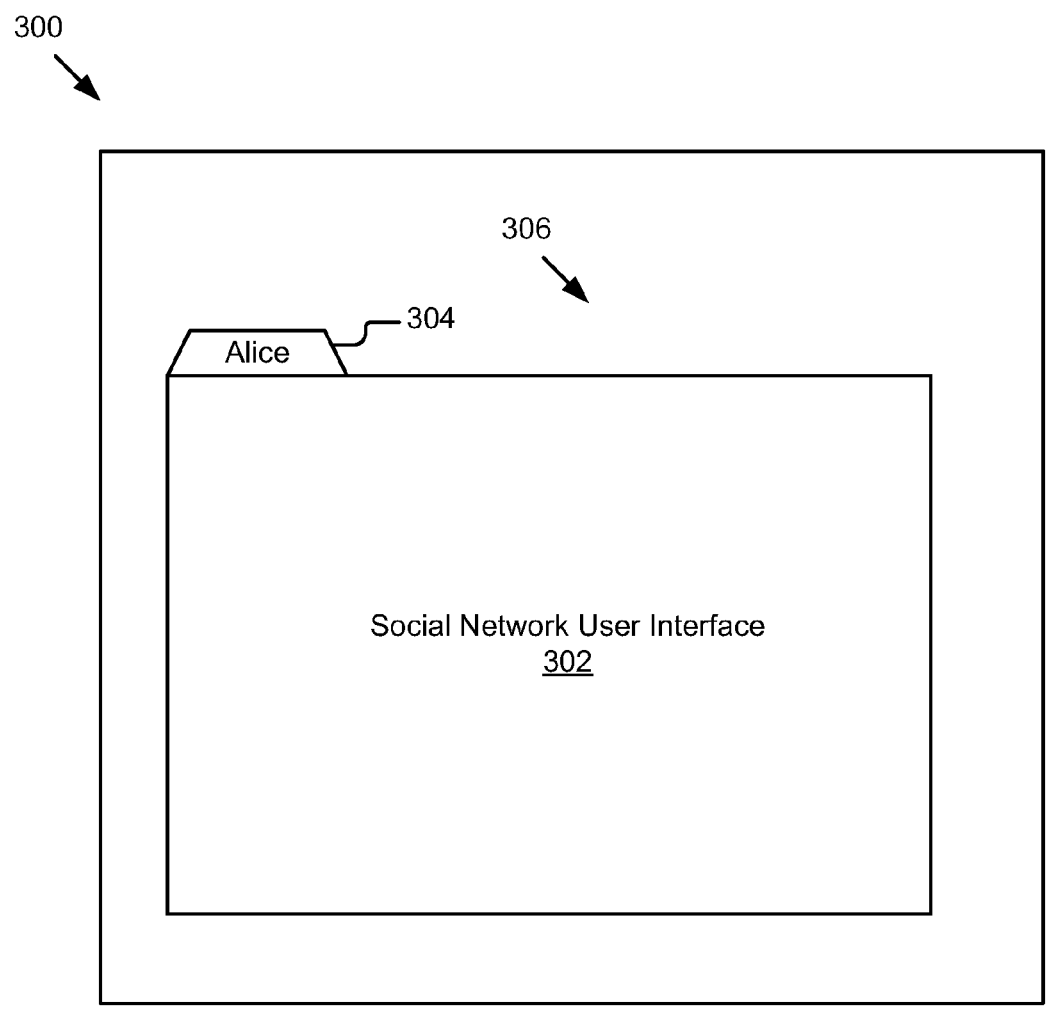
FIGS. 3A-3C are graphical representations of an example shared identity user interface.
Figure 3B:
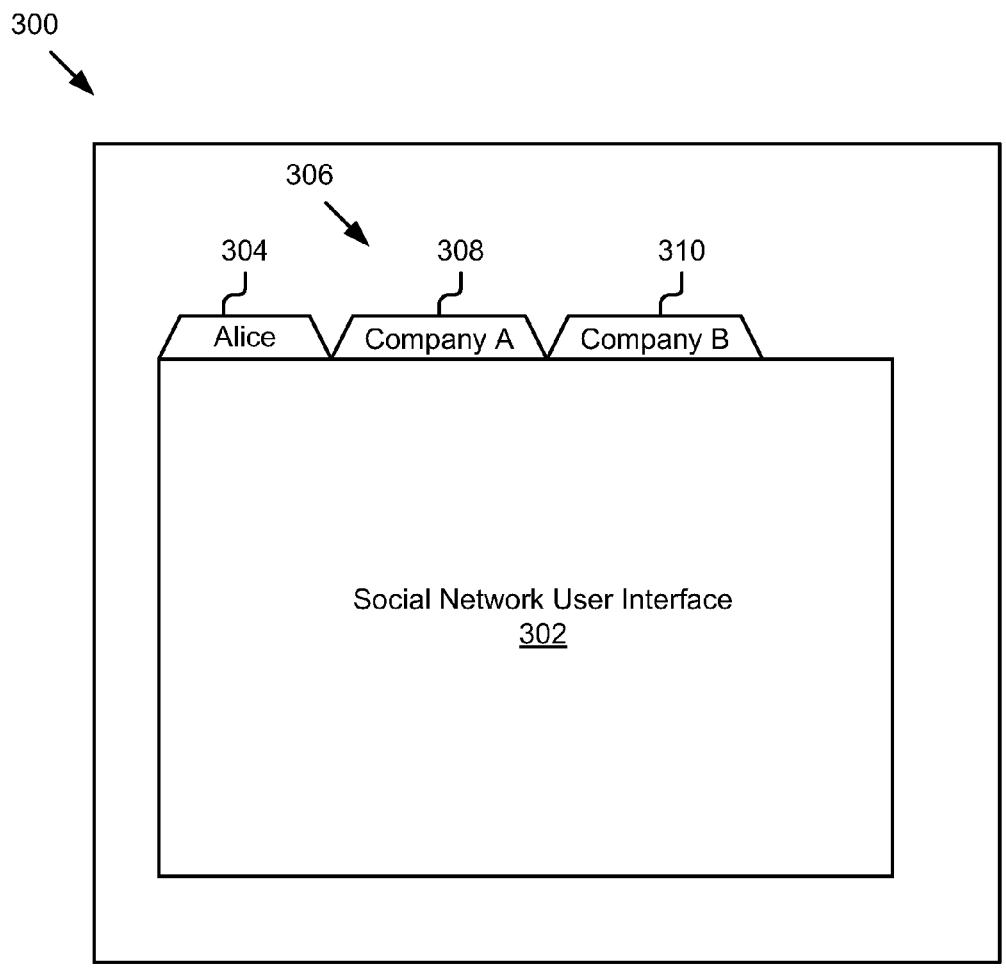
Figure 3C:
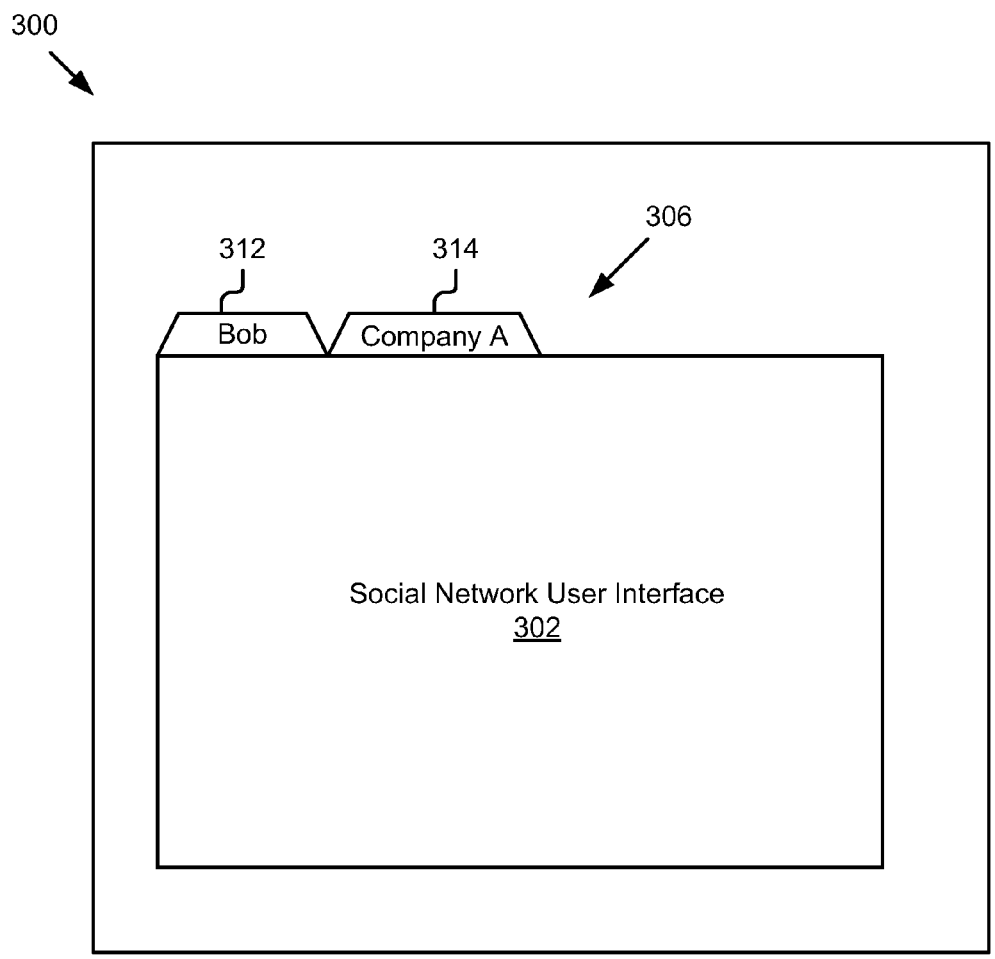

Referring now to FIGS. 3A-3C, examples of a shared identity user interface 306 are shown. FIG. 3A shows a window 300 including the shared identity user interface 306 of the present disclosure. FIG. 3A shows an interface according to the present disclosure where an individual user, Alice, has not been delegated any rights and therefore, Alice only has the ability to interact with the social network application 109 using her own identity. The shared identity user interface 306 provides only a single tab 304 that represents Alice as an individual since she has no rights to act on behalf of other organizations. The shared identity user interface 306 provides a second region 302 with all the conventional functionality to interact with the social network application 109. Although the details are not shown, this region 302 would include the ability to perform various activities currently available on the social network. For example, a window area of a browser.

Referring now to FIG. 3B, another example of the shared identity user interface 306 is shown. In this case, Alice has been delegated rights to perform activities on behalf of Company A and Company B. Thus, the shared identity user interface has been updated to include two additional tabs 308, 310. If Alice's has selected tab 304, the social network user interface 302 is shown and operable in the region below the tabs. When tab 304 is selected, all activities performed by Alice will be associated with Alice's individual identity on the social network application 109. However, if Alice selects the Company A tab 308, the region beneath the tabs 304, 308, 310 will again present a conventional social network user interface 302. However, any activities undertaken by Alice with this second tab 308 selected will be translated and appear on the social network as if they were performed by Company A. Similarly, if the third tab 310 for Company B is selected, all activities undertaken in the social network user interface 302 below the third tab 310 for Company B will be translated and appear on the social network if they were performed by Company B. This shared identity user interface 306 is particularly advantageous for number of reasons. First, authentication of Alice as the delegate for Company A and Company B is automatic and no additional authentication processes are required for Alice. Second, Alice does not need to learn various user interfaces, possibly with different functionality, where each of the different user interfaces correspond to different companies. Alice is able to perform the functions on behalf of either Company A or Company B using the same user interface that she uses to interact with the social network as an individual. Third, the user is able to easily switch contexts from interfacing with the social network as an individual versus interfacing with the social network as an organization. The user only has to select the tab 304, 308, 310 corresponding to the context in which the user wants to interact with the social network.

Referring now to FIG. 3C, another example of the shared identity user interface 306 is shown. In this embodiment, the shared identity user interface 306 is for another user, Bob. The first tab 312 is for Bob's interactions with the social network as an individual. The shared identity user interface 306, however, also includes a second tab 314 where Bob can act as a delegate of Company A. It should be understood that the user interface of FIGS. 3B and 3C can be used at the same time, thereby allowing both Alice and Bob to act on behalf of Company A. This is particularly advantageous because it allows an organization to delegate rights to any number of people depending on the size of the organization. In other implementations, the social network user interface 302 provided for each individual user acting as a delegate for the company can be restricted or modified to provide different types of functionality to different users while still allowing them to appear on the social network as if they are acting for the company. In such an embodiment, when Bob selects tab 314, he may be presented with different options and functionality for interaction with the social network application 109 than when Alice selects tab 308 of her shared identity user interface 306.

It should be understood that while only one tab is been shown for Bob and two tabs have been shown for Alice, a given delegate may have been delegated rights from any number of organizations. Furthermore, any number of users may be delegated rights and thereby have a shared identity interface 306 similar to that shown in FIGS. 3B and 3C is for Alice and Bob.

Figure 4:
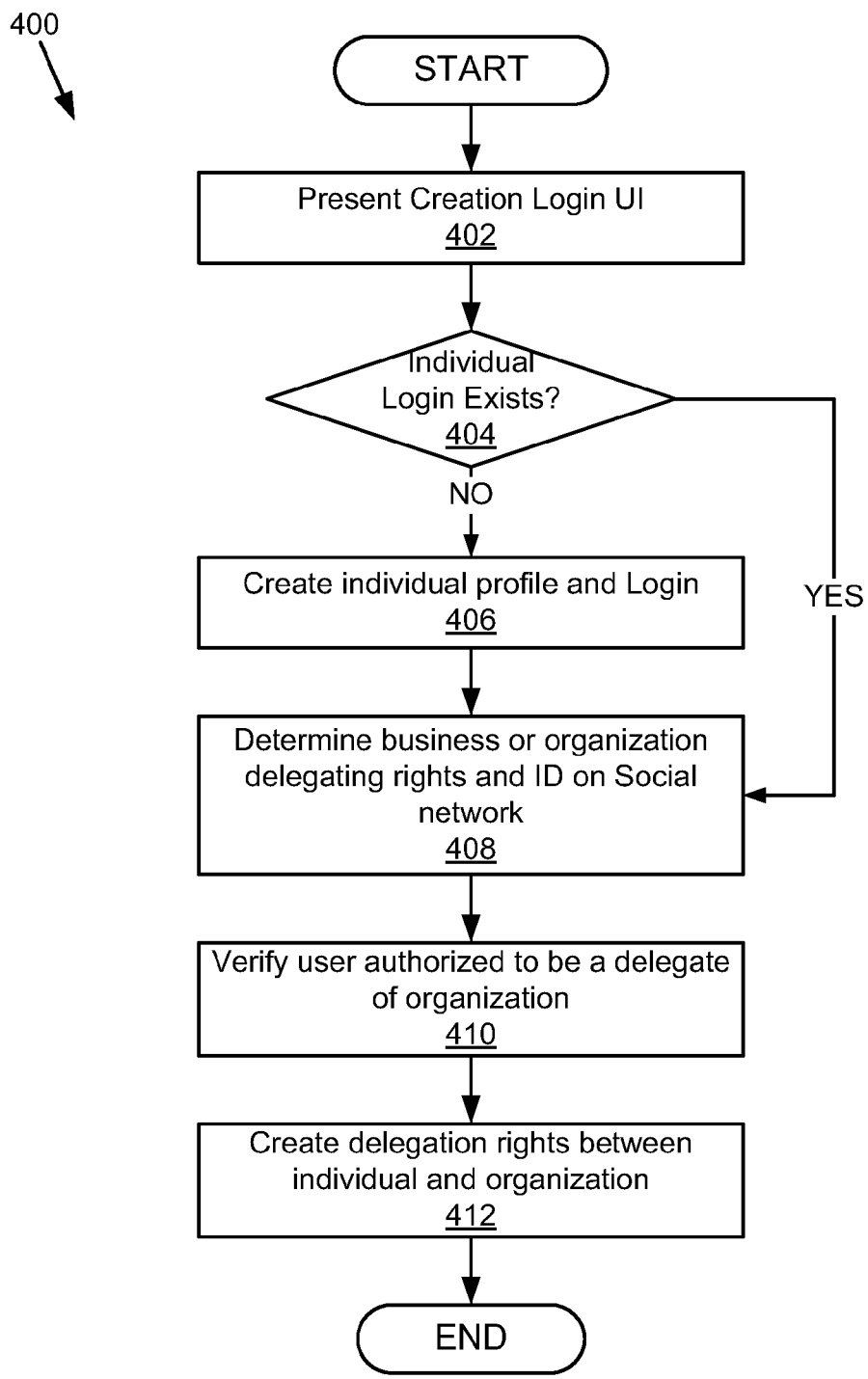
FIG. 4 is a flowchart of an example method for creating delegation rights.
Figure 5:
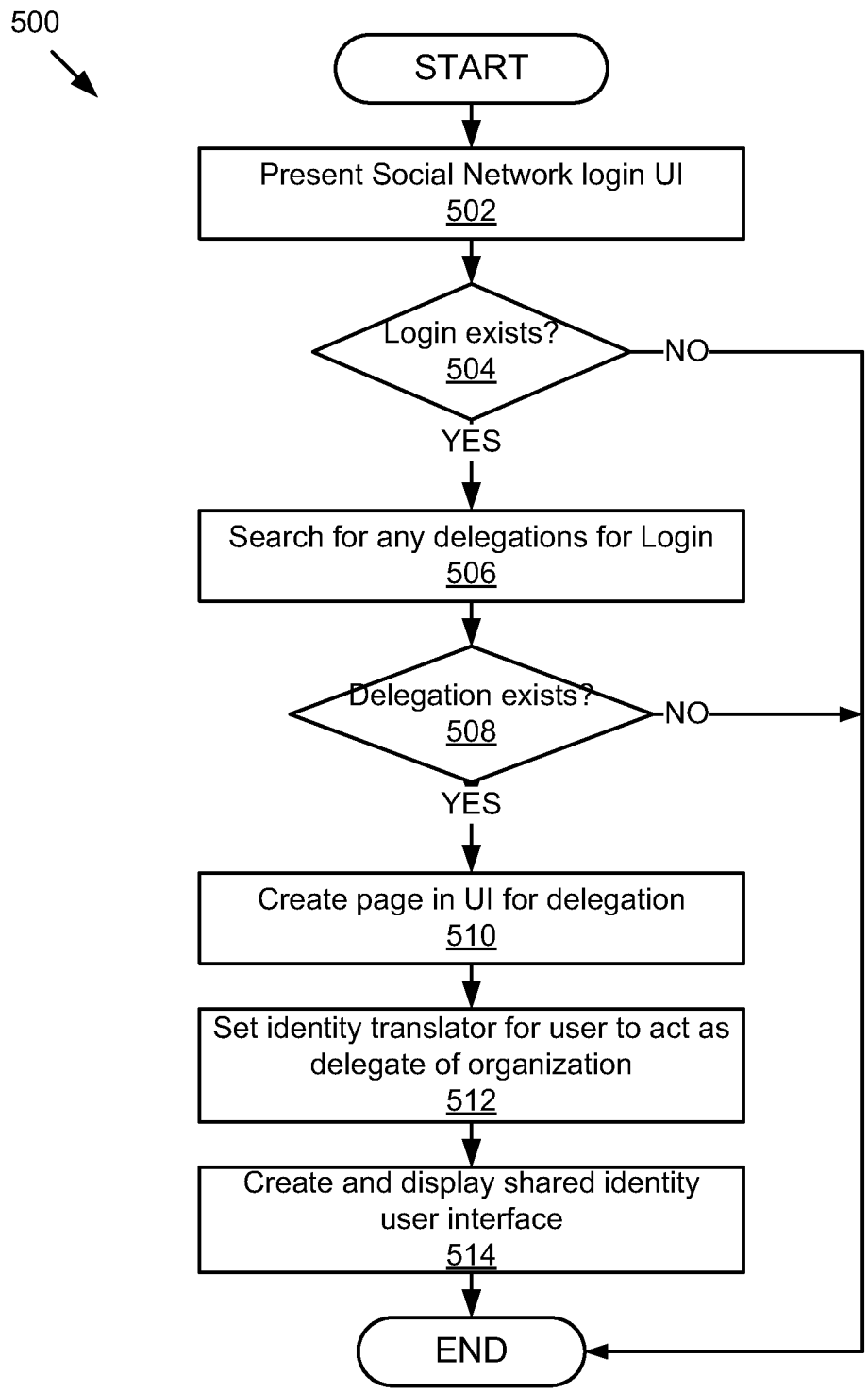
FIG. 5 is a flowchart of an example method for generating a shared identity user interface.
Figure 6:
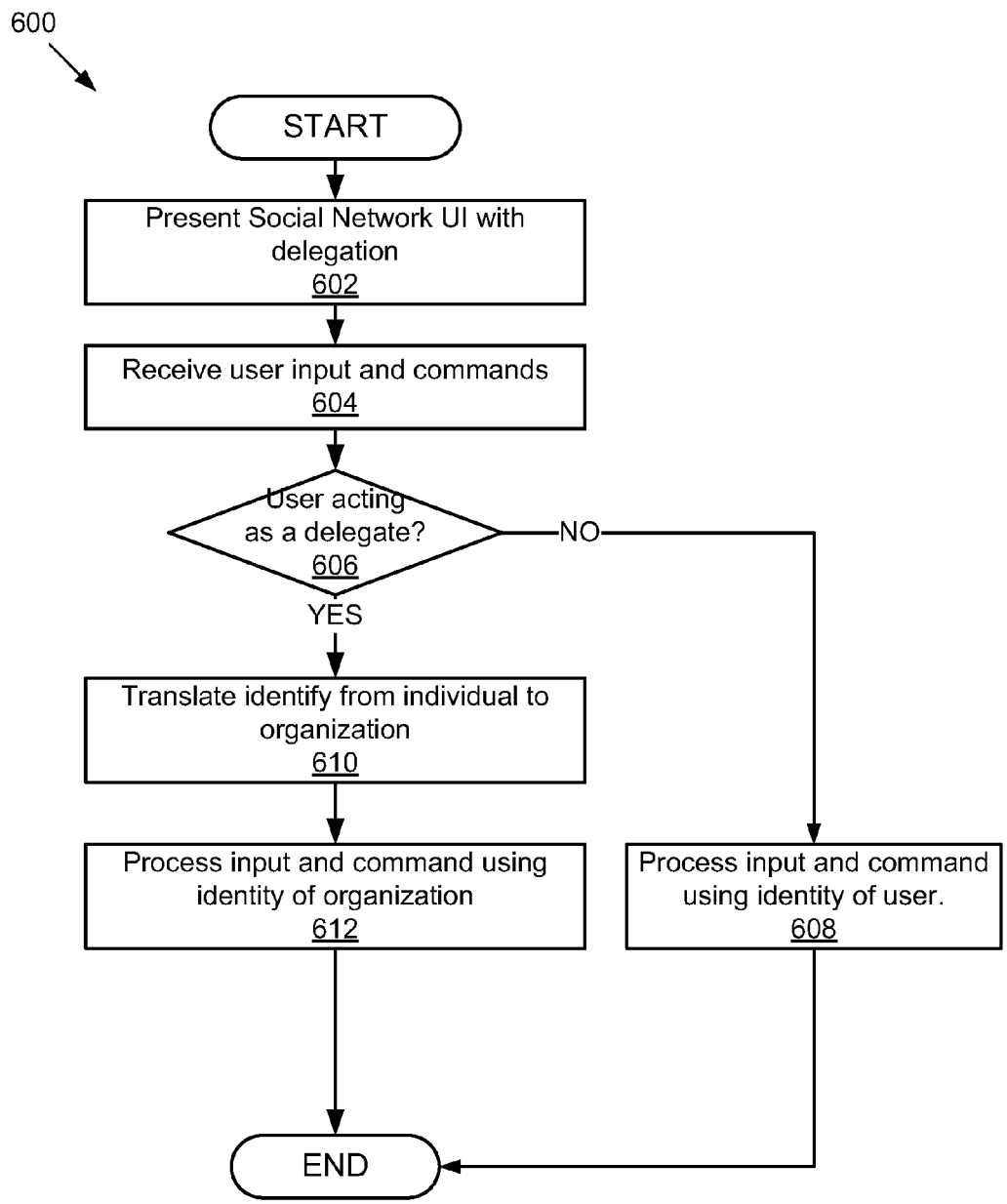
FIG. 6 is a block diagram of an example method for processing and accepting input to manage business activity from a shared identity user interface.

Referring now to FIGS. 4-6, various implementations of the methods of the present disclosure will be described.

FIG. 4 is a flowchart of an example method 400 for creating delegation rights. The method for creating delegation rights in a social network begins by presenting 402 a user interface for creating or delegating rights for an organization. In some implementations, the user interface (not shown) includes login fields for users to submit their username and password in a conventional manner similar to those known for accessing any computerized system. Next the delegation module 103 receives the input user ID and password, and determines 404 whether the user already exists, and thus has an identity in the social network application 109. If not, the user is prompted, and the system creates 406 an individual profile, login and password to create an individual identity within the social network. After an individual profile and login have been created, the user continues to step 408. On the other hand, if the individual already has an identity in terms of a user name and password on the social network application 109, the method proceeds directly from step 404 to step 408.

In step 408, the method determines 408 the business or organization delegating rights to the individual user and determines the individual user's identity on the social network. In some implementations, the different organizations that have a presence on the social network are provided in a drop-down list, and the user can input a selection of an organization. Since the user is logged in using their newly created identity or a pre-existing identity, this identity is associated with the input selection of an organization.

Next, the method continues with the delegation module 103 verifying 410 that the user is authorized to be a delegate of the selected organization. In some implementations, the user is prompted to input an authorization code maintained by the delegation module 103 that confirms the user has the rights to become a delegate. In other implementations, the user makes a request and the owner of the organization's account is sent a communication (in system message, e-mail, text etc.) asking for confirmation that the user is allowed to act on the organization's behalf within the social network, and if confirmation is received, the method is allowed to continue to delegate rights. In yet other implementations, the administrator of the interaction with the social network for the organization can input predefined delegation rights including what actions can be taken by a particular user. The information stored by the administrators is accessed to verify the rights that this particular individual has been authorized to act on behalf of the organization.

After step 410, the method continues by creating delegation rights or (an association) between the individual and the organization, and stores the rights or association in the data storage 208 of the delegation module 103. These delegated rights or association are later used by the delegate authentication module 204 to automatically authorize a particular individual to act on behalf of the organization and create the shared identity user interface described above with reference to FIG. 3. In alternate implementations, the delegation rights or association are stored in the social network application 109, or the profile server 127.

Referring now to FIG. 5, an example method 500 for generating and presenting the shared identity user interface 306 will be described. The method begins by presenting 502 a conventional social network login user interface. For example, such a user interface could include logos or other graphics to indicate the social network being accessed, along with fields prompting the user to enter a username and password. Next the method receives an input user ID and password from the user. The system determines 504 whether a login corresponding to the input exists. In other words, whether the user has input a valid user ID and password. If not, the method is complete and ends. However, if the method determines 504 that the user ID and password are valid, the method continues to step 506. In step 506, the method searches for any delegations for the identity of the individual that just logged in. In some implementations, the delegations are discovered by searching the data storage 208 for the user ID and determining whether there are any corresponding delegation of rights to other organizations associated with that user ID.

Next, the method determines 508 whether any delegations for this individual identity were discovered. If not, the method is complete and ends. On the other hand, if one or more delegations for this individual identity were discovered, access to those other organizations is automatically initiated and the shared identity user interface is generated and presented. The method continues by creating 510 a tab and associated page in the user interface for each delegation. For example, in a case of Alice and FIG. 3D, this step would create the first tab 304 where Alice acts with her individual identity, a second tab 308 where Alice acts on behalf of Company A, and a third tab 310 where Alice acts on behalf of Company B. It should be understood that each of these components of the shared identity user interface 306 may have different functionality on each page accessed by each respective tab. Next, the method continues by setting 512 an identity translator for use when the user acts as a delegate of the organization. Continuing the same example, a translator sends activities performed under the second tab 308 such that any action Alice takes would appear as if it were on behalf of Company A. For example, any posts, micro-blogs, comments, photo sharing, acknowledgment which can be a positive or negative endorsement, approving, disapproving, or other information would appear as if they are coming from Company A and would be associated with the area within the social network for Company A. The method automatically authenticates the user to act on behalf of the companies for which tabs are created in the shared identity user interface 306. The method completes by creating and displaying 514 the shared identity user interface 306 with its multiple tabs and with the user already authenticated.

Referring now to FIG. 6, an example method 600 for processing and accepting input to manage business activity from a shared identity user interface 306 will be described. The method begins by presenting 602 the shared identity user interface 306. Next the method receives 604 user input and commands. The method determines 606 whether the user is acting as a delegate. This can be determined based upon the tab selected by the user and by the user interface below the selected tab. If the user is not acting as a delegate, any actions taken by the user with regard to the social network or any other activities performed are associated with the individual user identity are processed 608 normally as the social network application 109 would process those inputs. On the other hand, if in step 606 the method determines that the user is acting as a delegate, the execution of input and other actions received from the user are first translated 610 so that the identity is changed from the user as an individual to the user acting on behalf of the organization. In the above example, this means that if Alice were acting under tab 308, any activity she undertook would be changed such that it appeared that those actions were taken by Company A and relative to Company A's presence on the social network. Next, the method processes 612 the inputs and commands received from the user in step 604 but using the identity of the organization. After the input has been processed, the method is complete and ends.

Systems and methods for using delegation as a mechanism to manage business activity by taking on a shared identity have been described. In the above description, for purposes of explanation, numerous specific details are set forth in order to provide a thorough understanding of the disclosure. It should be understood, however, that the disclosure can be practiced without these specific details. In other instances, structures and devices are shown in block diagram form in order to avoid obscuring the disclosure. For example, the present disclosure is described in some implementations above with reference to user interfaces and particular hardware. However, the present disclosure applies to any type of computing device that can receive data and commands, and any peripheral devices providing services.

Reference in the specification to "one implementation," "an implementation," "some implementations," etc., means that a particular feature, structure, or characteristic described in connection with the embodiment is included in at least one embodiment of the disclosure. The appearances of the phrase "in some implementations" in various places in the specification are not necessarily all referring to the same implementation or implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

The invention claimed is:

1. A computer-implemented method comprising:
   determining by a processor that a user, under an individual user identity, is authorized to manage a personal activity on a social network provided by a social network application;
   determining by the processor that the individual user identity is authorized to act as a delegate for an organization having an identity on the social network that is distinct from the individual user identity belonging to the user;
   setting a translator for processing input provided by the user under the individual user identity while acting as the delegate for the organization;
   receiving by the processor under the individual user identity input from the user to manage a business activity associated with the organization;
   determining the user to be acting as the delegate for the organization based on the input;
   translating with the translator the input to manage the business activity from being received under the individual user identity to being received under the identity of the organization; and
   automatically providing translator data describing the input to manage the business activity as being received under the identity of the organization to the social network application, the social network application being configured to provide data describing the business activity for presentation to one or more other users of the social network.

2. The computer-implemented method of claim 1, wherein the business activity includes a social network activity selected from a group of posting, blogging, sharing photos, approving, disapproving, and acknowledging using a positive or negative endorsement.

3. The computer-implemented method of claim 1, further comprising:
   receiving authentication credentials for the individual user identity from the user associated with the individual user identity; and
   authenticating the individual user identity by comparing the authentication credentials against credentials stored in a data store, wherein the user is determined to be acting as the delegate for the organization automatically without any additional user authentication being required.

4. The computer-implemented method of claim 1, wherein determining the user to be acting as the delegate further comprises:
   identifying in a data store one or more delegations between one or more organizations and the individual user identity; and
   providing the individual user identity access to act on behalf of the one or more organizations for which a delegation is identified in the data store.

5. The computer-implemented method of claim 4, wherein identifying includes identifying a plurality of delegations between a plurality of organizations and the individual user identity, and providing includes providing the individual user identity access via a shared user identity interface to act on behalf of each of the plurality of organizations, the shared user identity interface having a context for each of the plurality of organizations.

6. The computer-implemented method of claim 1, further comprising:
   providing information for a user interface for requesting a delegation allowing the individual user identity to act on behalf of the organization;
   receiving a request for the delegation; and
   obtaining authorization for the delegation via a predefined mechanism.

7. The computer-implemented method of claim 1, further comprising:
   generating a shared identity user interface including a first context that represents the user as an individual and a second context that represents the identity of the organization, each of the first context and the second context including a selector specifying which identity is associated with the first context and the second context and a region to accept input to manage an activity on the social network and display information related to the identity specified by the selector; and
   presenting the shared identity user interface to the user associated with the individual user identity authorized to act as the delegate for the organization.

8. The computer-implemented method of claim 7, wherein the selector is a tab and the region is window area corresponding to the tab.

9. A computer program product comprising a non-transitory computer-readable medium storing a computer-readable program, wherein the computer-readable program, when executed on a computer, causes the computer to perform steps comprising:
   determining by a processor that a user, under an individual user identity is authorized to manage a personal activity on a social network;
   determining by the processor that the individual user identity is authorized to act as a delegate for an organization having an identity on the social network that is distinct from the individual user identity belonging to the user;
   setting a translator for processing input provided by the user under the individual user identity while acting as the delegate for the organization;
   receiving by the processor under the individual user identity input from the user to manage a business activity associated with the organization;
   determining the user to be acting as the delegate for the organization based on the input;
   translating with the translator the input to manage the business activity from being received under the individual user identity to being received under the identity of the organization; and
   automatically providing translator data describing the input to manage the business activity as being received under the identity of the organization to social network application, the social network application being configured to provide data describing the business activity for presentation to one or more other users of the social network.

10. The computer program product of claim 9, wherein the business activity includes a social network activity selected from a group of posting, blogging, sharing photos, approving, disapproving, acknowledging using a positive or negative endorsement.

11. The computer program product of claim 9, wherein the computer-readable program, when executed on a computer, further causes the computer to perform steps of:
    receiving authentication credentials for the individual user identity from the user associated with the individual user identity; and authenticating the individual user identity by comparing the authentication credentials against credentials stored in a data store, wherein the user is determined to be acting as the delegate for the organization automatically without any additional user authentication being required.

12. The computer program product of claim 9, wherein determining the user to be acting as the delegate further comprises:
identifying in a data store one or more delegations between one or more organizations and the individual user identity; and
providing the individual user identity access to act on behalf of the one or more organizations for which a delegation is identified in the data store.

13. The computer-implemented method of claim 12, wherein identifying includes identifying a plurality of delegations between a plurality of organizations and the individual user identity, and providing includes providing the individual user identity access via a shared user identity interface to act on behalf of each of the plurality of organizations, the shared user identity interface having a context for each of the plurality of organizations.

14. The computer program product of claim 9, wherein the computer-readable program, when executed on a computer, further causes the computer to perform steps of:
providing information for a user interface for requesting a delegation allowing the individual user identity to act on behalf of the organization;
receiving a request for the delegation; and
obtaining authorization for the delegation via a predefined mechanism.

15. The computer program product of claim 9, wherein the computer-readable program, when executed on a computer, further causes the computer to perform steps of:
generating a shared identity user interface including a first context that represents the user as an individual and a second context that represents the identity of the organization, each of the first context and the second context including a selector specifying which identity is associated with the first context and the second context and a region to accept input to manage an activity on the social network and display information related to the identity specified by the selector; and
presenting the shared identity user interface to the user associated with the individual user identity authorized to act as the delegate for the organization.

16. The computer program product of claim 15, wherein the selector is a tab and the region is window area corresponding to the tab.

17. A system comprising:
one or more processors;
a user interface module executable by the one or more processors to receive input signals from and to send information to a user, the input signals including an input to manage a business activity associated with an organization,
a delegate authentication module executable by the one or more processors to determine that an individual user identity is authorized to act as a delegate for the organization having an identity on a social network that is distinct from the individual user identity belonging to the user and to generate a verification signal, the user, under the individual user identity being authorized to manage a personal activity on the social network, the delegate authentication module coupled to the user interface module to receive the input signals from the user and to determine the user to be acting as the delegate for the organization based on one or more of the input signals; and
an identity translation module executable by the one or more processors to translate the input signals from the user to a format such that they appear to be from the identity of the organization and to automatically provide data describing the input signals to manage the business activity as being received under the identity of the organization to a social network application, the social network application being configured to provide data describing the business activity for presentation to one or more other users of the social network, the identity translation module coupled to the user interface module to send and receive information, and coupled to the delegate authentication module to receive the verification signal.

18. The system of claim 17, wherein the business activity includes a social network activity selected from a group of posting, blogging, sharing photos, approving, disapproving, and acknowledging using a positive or negative endorsement.

19. The system of claim 17, further comprising a delegation creation module executable by the one or more processors to create a delegation relationship between the individual user identity and the organization.

20. The system of claim 17, further comprising a delegation creation module executable by the one or more processors to receive authentication credentials for the individual user identity from the user, wherein the delegate authentication module is configured to authenticate the individual user identity by comparing the authentication credentials against credentials stored in a data store and the delegate authentication module is configured to determine the user to be acting as the delegate for the organization automatically without requiring any additional user authentication.

21. The system of claim 19, wherein the delegation creation module is further configured to generate a user interface for requesting a delegation allowing the individual user identity to act on behalf of the organization, receive a request for the delegation via the user interface, and obtain authorization for the delegation via a predefined mechanism.

22. The system of claim 17, further comprising a data store storing one or more delegations between one or more organizations and the individual user identity, wherein the delegate authentication module is configured to provide the individual user identity access to act on behalf of the one or more organizations for which a delegation is stored in the data store.

23. The system of claim 17, wherein the user interface module is operable to generate a shared identity user interface including a first context that represents the user as an individual and a second context that represents the identity of the organization, each of the first context and the second context including a selector specifying which identity is associated with the first context and the second context and a region to accept input to manage an activity on the social network and display information related to the identity specified by the selector, the user interface module being further configured to present the shared identity user interface to the user associated with the individual user identity authorized to act as the delegate for the organization.

* * * * *